(12) United States Patent
Lin et al.

(10) Patent No.: US 8,900,671 B2
(45) Date of Patent: Dec. 2, 2014

(54) METHOD FOR MANUFACTURE OF AN INFUSED SPAR CAP USING A LOW VISCOSITY MATRIX MATERIAL

(75) Inventors: Wendy Lin, Niskayuna, NY (US);
Rainer Koeniger, Neufahrn (DE);
Rachel Marie Suffield, Simpsonville, SC (US); Mohamad Sultan, Simpsonville, SC (US); Jason Testa, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 949 days.

(21) Appl. No.: 13/036,853

(22) Filed: Feb. 28, 2011

(65) Prior Publication Data
US 2012/0219424 A1    Aug. 30, 2012

(51) Int. Cl.
| | | |
|---|---|---|
| *B05D 3/02* | (2006.01) | |
| *B29C 70/28* | (2006.01) | |
| *F03D 1/06* | (2006.01) | |
| *B29K 105/00* | (2006.01) | |
| *B29L 31/08* | (2006.01) | |

(52) U.S. Cl.
CPC .............. *F03D 1/0675* (2013.01); *B29C 70/28* (2013.01); *Y02E 10/721* (2013.01); *F05B 2280/6015* (2013.01); *B29K 2105/0094* (2013.01); *B29L 2031/085* (2013.01)
USPC ........................................ 427/389.9; 427/379

(58) Field of Classification Search
None
See application file for complete search history.

(56) References Cited

U.S. PATENT DOCUMENTS

| | | | |
|---|---|---|---|
| 5,342,909 A | 8/1994 | Grubbs et al. | |
| 5,840,238 A | 11/1998 | Setiabudi et al. | |
| 6,001,909 A | 12/1999 | Setiabudi | |
| 6,100,323 A | 8/2000 | Setiabudi et al. | |
| 6,310,121 B1 | 10/2001 | Woodson, Jr et al. | |
| 6,369,157 B1 * | 4/2002 | Winckler et al. | ............. 524/783 |
| 6,407,190 B1 | 6/2002 | Van Der Schaaf et al. | |
| 6,409,875 B1 | 6/2002 | Giardello et al. | |
| 6,525,125 B1 | 2/2003 | Giardello et al. | |
| 7,153,090 B2 | 12/2006 | DeLeonardo et al. | |
| 7,339,006 B2 | 3/2008 | Giardello et al. | |
| 7,377,752 B2 | 5/2008 | Mohamed | |
| 7,879,963 B2 | 2/2011 | Koeniger et al. | |
| 7,906,568 B2 | 3/2011 | Wei et al. | |
| 2002/0153096 A1 | 10/2002 | Giardello et al. | |
| 2003/0116262 A1 * | 6/2003 | Stiesdal et al. | ................ 156/245 |
| 2006/0225278 A1 | 10/2006 | Lin et al. | |
| 2008/0181781 A1 | 7/2008 | Livingston et al. | |
| 2008/0191564 A1 | 8/2008 | Piper et al. | |
| 2009/0048422 A1 | 2/2009 | Tsai et al. | |

(Continued)

FOREIGN PATENT DOCUMENTS

| | | | |
|---|---|---|---|
| WO | WO 97/14738 | 4/1997 | |
| WO | WO 2008/010198 | * | 1/2008 |

*Primary Examiner* — Erma Cameron
(74) *Attorney, Agent, or Firm* — Sutherland, Asbill & Brennan LLP

(57) ABSTRACT

Embodiments of the present application generally provide for wind turbine blade spar caps comprising composite materials prepared using a low viscosity resin system and a high density fabric and methods for their manufacture. In particular embodiment, the low viscosity resin system has a viscosity in the range of about 1 to about 100 centipoises at a temperature in the range of about 0° C. to about 125° C. during the preparation of the composite material. By using low viscosity resin systems, composite materials have been prepared having a fiber volume fraction of greater than about 65% and a composite modulus of greater than 48000 MPa.

5 Claims, 2 Drawing Sheets

(56) References Cited

U.S. PATENT DOCUMENTS

| | | |
|---|---|---|
| 2009/0061713 A1 | 3/2009 | Lin et al. |
| 2009/0062441 A1 | 3/2009 | Wei et al. |
| 2009/0062442 A1 | 3/2009 | Wei et al. |
| 2009/0156726 A1 | 6/2009 | Koeniger et al. |
| 2009/0196756 A1 | 8/2009 | Althoff |
| 2010/0104447 A1 | 4/2010 | Eyb |

* cited by examiner

METHOD FOR MANUFACTURE OF AN INFUSED SPAR CAP USING A LOW VISCOSITY MATRIX MATERIAL

BACKGROUND

The present application relates to generally to wind turbines and particularly to wind turbine blades. More particularly, embodiments of the present application provide methods for manufacturing spar caps using a low viscosity matrix material for optimized technical quality and reduced cost.

Wind power and the use of wind turbines have gained increased attention as the quest for alternative energy sources continues. Wind power may be considered one of the cleanest, most environmentally friendly energy sources presently available. Different from traditional fossil fuel sources, wind power is completely renewable and does not produce noxious or environmentally harmful bi-products. With an increasing attention towards generating more energy from wind power, technological advances in the art have allowed for increased sizes of wind turbines and new designs of wind turbine components. However, as the physical sizes and availability of wind turbines increase, so does the need to balance the cost of manufacturing and operating wind turbines to further allow wind power to be cost-competitive with other energy sources.

A modern wind turbine 10, illustrated in FIG. 1, typically includes a rotor 12 having multiple blades 14 extending therefrom. The rotor 12 is drivingly connected to an electrical generator (not shown) housed within a nacelle 16 atop a tower 18. The blades 14 are exposed to the wind, and capture and transform the kinetic energy of the wind into a rotational motion of the rotor 12 about an axis. The rotational motion is further converted by the electrical generator into electrical energy, which is then fed into the utility grid.

The size, shape, and weight of the blades contribute significantly to the cost and energy efficiencies of wind turbines. An increase in blade size and decrease in blade weight generally increases the energy efficiency of a wind turbine; however, decreasing the blade weight also can result in significantly higher costs due to the increased costs associated with the specialized lightweight materials.

Typically, the spar caps make up approximately one third of the total turbine blade mass. It therefore would be desirable to reduce the weight of the spar cap in order to reduce the weight of the blade, thereby increasing the energy efficiency of the wind turbine. In particular, it would be desirable to increase the composite fiber volume fraction of the spar cap while also increasing the tensile modulus and composite stiffness of the composite material so as to allow for potential reduction in material consumption and blade cost.

BRIEF DESCRIPTION

Embodiments of the present application address the above-described needs by providing a wind turbine blade spar cap comprising a composite material including a low viscosity resin system and a high density fabric.

In one aspect, a method of manufacturing a wind turbine blade spar cap using a low viscosity resin system, is provided, the method comprising preparing a high density fabric with a low viscosity resin system to provide a composite material, wherein the low viscosity resin system has a viscosity in the range of about 1 to about 100 centipoises at a temperature in the range of about 0° C. to about 125° C.

In another aspect, a wind turbine blade spar cap is provided comprising a composite material prepared by applying a low viscosity resin system to a high density fabric to provide a composite material, wherein the low viscosity resin system has a viscosity in the range of about 1 to about 100 centipoises at a temperature in the range of about 0° C. to about 125° C.

In still another aspect, a wind turbine blade is provided comprising the aforementioned wind turbine blade spar cap.

DRAWINGS

DETAILED DESCRIPTION

Figure 1:
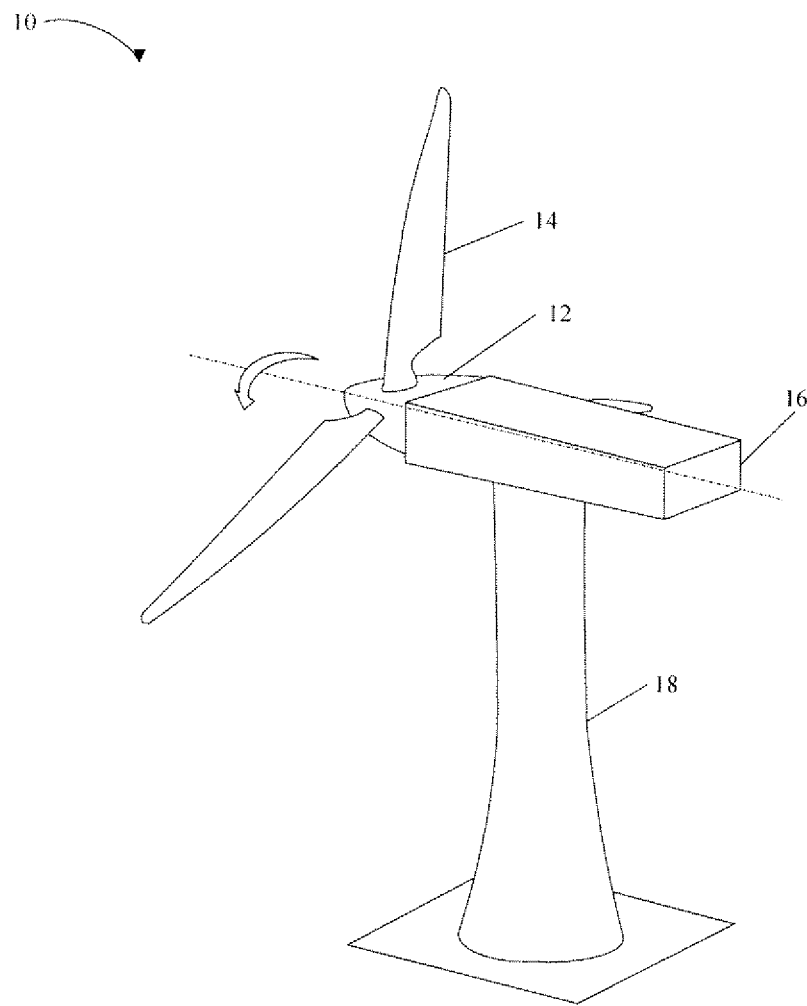
FIG. 1 is a schematic view of a wind turbine.

Embodiments of the present application generally provide for wind turbine blade spar caps prepared from a low viscosity resin system and methods for their manufacture. Referring now to the drawings, in which like numerals indicate like elements throughout the several views, FIG. 1 is an exemplary illustration of a wind turbine blade 10, wherein aspects of the present application can be incorporated.

Figure 2:
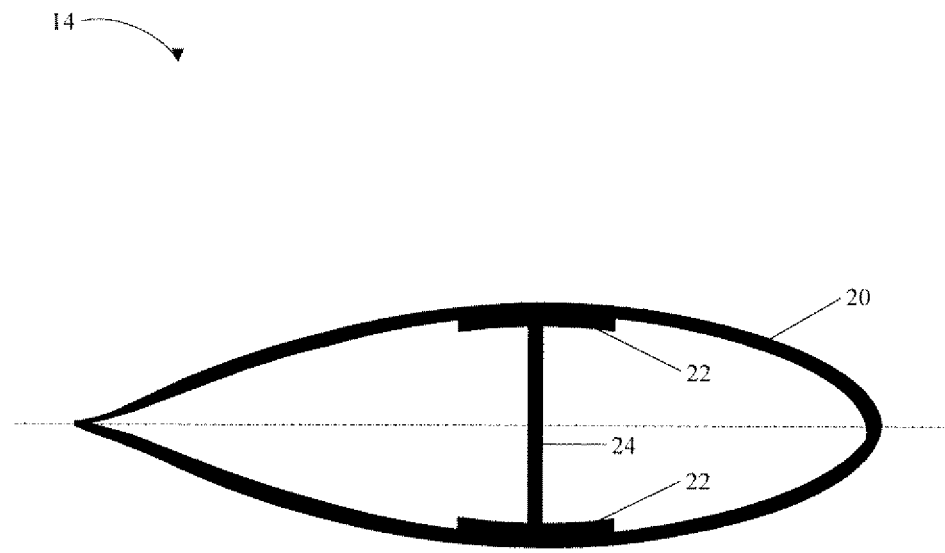
FIG. 2 is a cross-sectional view of a wind turbine blade according to an embodiment of the present application.

As illustrated in FIG. 2, the construction of modern blades includes a skin or shell 20, spar caps 22, and one or more shear webs 24. The skin 20 typically is manufactured from layers of fiber composite and a lightweight core material and forms the exterior aerodynamic foil shape of the blade 10. The spar caps 22 provide increased blade 10 strength by integrating one or more structural elements running along the length of the blade 10 on both interior sides of the blade 10.

Prior art spar caps generally are fabricated using composite materials prepared using a polyester or epoxy resin having a viscosity range of 100-400 centipoises at a temperature in the range of 0° C. to 35° C. The spar caps of the present application, however, comprise a composite material prepared using a low viscosity resin system and a high density fabric.

The low viscosity resin system comprises a resin having a viscosity in the range of about 1 to about 100 centipoises, about 1 to about 80 centipoises, or about 1 to about 31 centipoises, at a temperature in the range of about 0° C. to about 125° C., about 0° C. to about 75° C., or about 0° C. to about 35° C. during the formation of the preparation of the composite material. In an embodiment, the low viscosity resin system is in the form of a monomer during the preparation of the composite material and/or formation of the spar cap. For example, in particular embodiments the low viscosity resin system comprises a dicyclopentadiene resin, a polybutylene terephthalate) cyclized resin, a carpolactone resin, a polyester or vinylester having a high styrene content, or a combination thereof. Suitable dicyclopentadiene resins are described in U.S. Pat. Nos. 5,840,238; 6,001,909; and 6,100,323, the disclosures of which are incorporated by reference. In another embodiment, the low viscosity resin system is in the form of a polymer during the preparation of the composite material and formation of the spar cap.

The high density fabric may be provided in any suitable form and may comprise any material suitable for providing reinforcement to the composite material. As used herein, high density fabric means a fabric architecture which allows greater than 65% fiber volume in a cured composite using a simple infusion process and include, for example, fabrics having 80% or greater of the fibers oriented in the warp or weft direction (and includes fabrics having 94% or greater of the fibers oriented in the warp or weft direction). In an embodiment, the high density fabric is comprised of carbon fibers, glass fibers, or a combination thereof in the form of a non-woven fabric, woven fabric, or roving unidirectional fabric with more than 80% of the fibers in a single direction. For example, the glass fibers and carbon fibers may be combined in a hybrid material as described in co-pending U.S. Patent Publication No. 2010/0104447, the disclosure of which is incorporated herein by reference. In still another embodiment, the high density fabric comprises a close packed unidirectional fabric supported by fine thermoplastic melt bonded thread.

Not wishing to be bound by any theory, it is believed that the use of a monomer in the low viscosity resin system allows for preparation of composite materials using more densely constructed fabrics to produce a polymeric composite material with an increased fiber volume fraction. The fiber volume fraction is a percentage of the volume of a laminate that is occupied by the fiber reinforcement (e.g., [Fiber Weight× Fiber Density]/[Composite Weight×Composite Density]). Increasing the composite fiber volume fraction increases the fiber-dominated properties, allowing for a reduction in the amount of resin used to prepare the composite materials (thereby reducing both weight and material cost).

In a particular embodiment, the fiber volume fraction of the composite material is greater than about 60%. In another embodiment, the fiber volume fraction is greater than about 63%. In still another embodiment, the fiber volume fraction is greater than about 65%. In still another embodiment the spar may be characterized by an increase in fiber volume fraction of the composite material greater than about 10% as compared to a spar cap prepared using an epoxy resin (e.g., in the range of about 10% and about 25%, in the range of about 12% and about 22%, or in the range of about 15% and about 22%).

The spar caps provided herein also provide for an increased composite modulus of the composite material as compared to the composite modulus of the epoxy resin used for preparing prior art spar caps. In an embodiment the spar cap is characterized by having a composite material with a composite modulus of greater than about 45000 MPa, greater than about 48000 MPa, or greater than about 50000 MPa. In another embodiment the spar cap is characterized by having a composite material with an increase in composite modulus in the range of about 10% and about 20% as compared to a spar cap prepared using an epoxy resin, in the range of about 12% and about 18%, or in the range of about 14% to about 16%.

Embodiments of the spar caps provided herein also are characterized as having a reduced thickness as compared to prior art spar caps. For example, the spar caps may be characterized by having a reduced overall spar cap thickness distribution in the range of about 5 mm to about 12 mm, about 5 mm to about 10 mm, about 5 mm to about 7 mm, or about 10 mm to about 12 mm.

Embodiments of the spar caps provided herein still further are characterized as having a reduced mass as compared to prior art spar caps. For example, the spar caps may be characterized as having about 8% to about 18% mass reduction, from about 9% to about 18% mass reduction, or from about 9% to about 12% mass reduction.

Also provided herein are methods for manufacturing a wind turbine blade spar cap comprising the above-described composite materials. In an embodiment, the method comprises laminating a high density fabric with a low viscosity resin system to provide a composite material and curing the composite material. In embodiments in which the low viscosity resin system comprises a monomer, the step of curing the composite material comprises heating the composite material to polymerize the low viscosity resin system and optionally further comprises post-curing the composite material to cross-link the polymerized low viscosity resin system.

Methods for laminating fabrics with resin systems are known in the art. In an embodiment the step of laminating comprises, for example, a resin infusion process using a vacuum bagging technique. Other methods of manufacturing the wind turbine blade spar cap using the above-described composite materials also are contemplated. For example, in another embodiment the method comprises a resin transfer molding process.

The technology disclosed herein offers various advantages over conventional approaches. For example, spar caps prepared using embodiments of the present application achieved a decrease in mass of over 400 kg as compared to embodiments prepared using epoxy resins and an increase in composite modulus to at least about 48,000 MPa, a 15% increase in composite modulus as compared to spar caps prepared using epoxy resins. These improvements enable production of wind turbine blades having a reduced mass or increased blade length using low cost materials.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a wind turbine blade spar cap using a low viscosity resin system, comprising:
    laminating a high density fabric with a low viscosity resin system to provide a composite material; and
    curing the composite material,
    wherein the composite material has a fiber volume fraction of greater than about 65%, and
    wherein the low viscosity resin system has a viscosity in the range of about 1 to about 100 centipoises at a temperature in the range of about 0° C. to about 125° C.

2. The method of claim 1, wherein the low viscosity resin system is selected from the group consisting of dicyclopentadiene resin, a poly(butylene terephthalate) cyclized resin, a polycaprolactone resin, a polyester having a high styrene content, a vinylester having a high styrene content, and combinations thereof.

3. The method of claim 1, wherein the high density fabric comprises glass fibers, carbon fibers, or a combination thereof.

4. The method of claim 1, wherein the low viscosity resin system comprises a monomer and the step of curing the composite material polymerizes the low viscosity resin system.

5. The method of claim 4, further comprising a post-curing of the composite material to cross-link the polymerized low viscosity resin system.

* * * * *